Figures 1, 2, 3, 4:
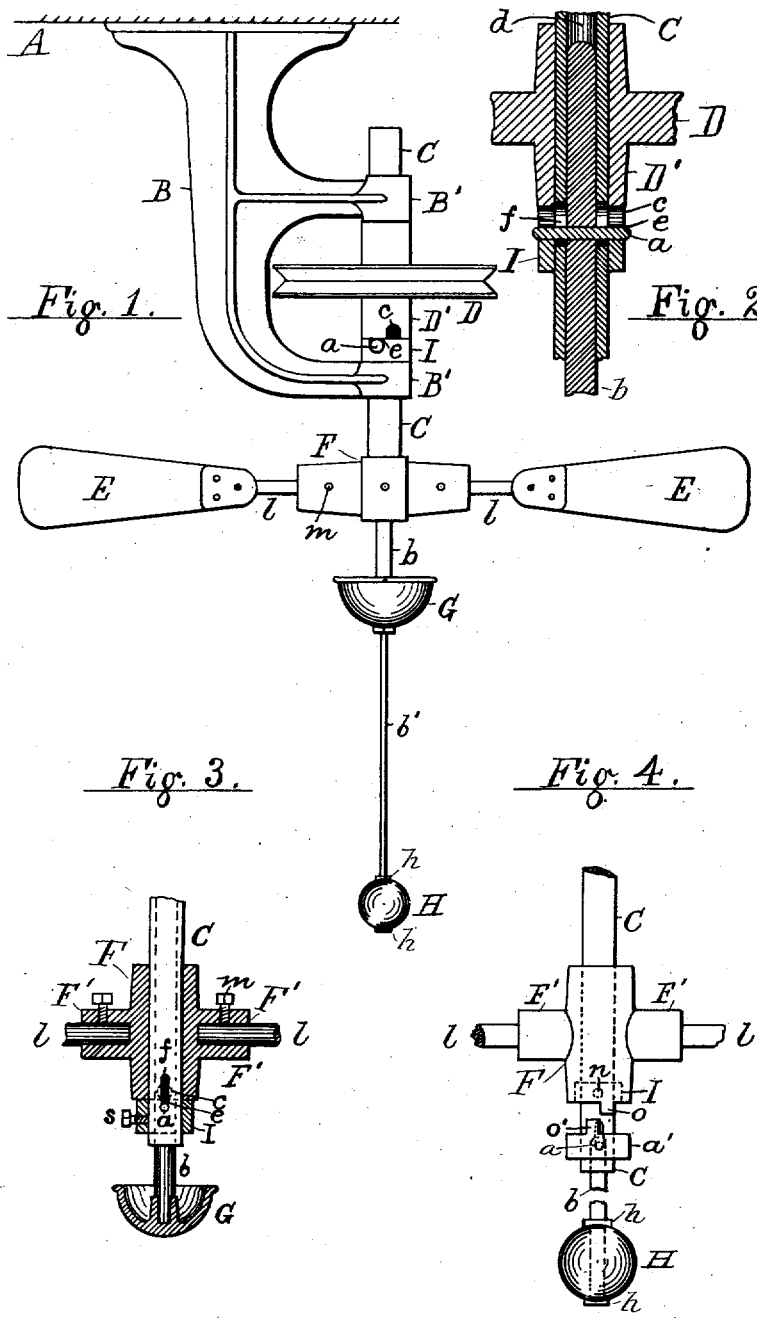

J. M. SEYMOUR.

AUTOMATIC FAN.

No. 10,539. Reissued Dec. 2, 1884.

Attest.

L. Lee

Henry J. Theberath.

Inventor.

Jas. M. Seymour, per Thos. S. Crane, atty.

N. PETERS, Photo-Lithographer, Washington, D. C.

UNITED STATES PATENT OFFICE.

JAMES M. SEYMOUR, OF NEWARK, NEW JERSEY.

AUTOMATIC FAN.

SPECIFICATION forming part of Reissued Letters Patent No. 10,539, dated December 2, 1884.

Original No. 284,077, dated August 28, 1883. Application for reissue filed June 25, 1884.

*To all whom it may concern:*

Be it known that I, JAMES M. SEYMOUR, a citizen of the United States, residing in Newark, Essex county, New Jersey, have invented certain new and useful Improvements in Automatic Fans, fully described and represented in the following specification and the accompanying drawings, forming part of the same.

This invention relates to an improvement in the rotary fans suspended from the ceilings of offices, counting-rooms, &c., to agitate the air in warm weather. A series of such fans are usually connected with a main driving-shaft by cords or belts, so as to revolve when the shaft is in motion, and such fans are thus operated during the entire time that they are connected with the driving-shaft, each fan consisting of two or more radial inclined blades attached to a hub that rotates and swings them around as long as it is affected by the motive power. When it is desired to stop a single fan of such a series, it has been customary to climb up to the line-shaft and throw off the belt, an operation of a very troublesome nature, and necessitating a repetition of the same trouble if the belt is to be replaced. The construction for the driving apparatus of such fans has not been provided with any stop-motion hitherto, partly because the fan-wings rotate in a large circle beneath the suspending hanger and pulley, and render any connection with the said hanger from beneath impossible; but finding that in such places as restaurants there is a frequent necessity to stop the movement of the fan, I have devised a connection to the driving mechanism through the center of the pendent shaft, and thus afforded the means of acting upon the fan from the floor and without deranging the belt in any manner.

The nature of my invention will be understood from the annexed drawings, in which—

Figure 1 is a side view of a rotary fan of the usual pattern, suspended from a ceiling, A, by hanger B, and upright fan-shaft C. Fig. 2 is a central sectional view of the driving-pulley D, and that portion of the shaft C which passes through it. Fig. 3 is a side view, partly in section, of the fan-hub F, having the clutch mechanism applied directly to it instead of to the driving-pulley, as in Fig. 1. Fig. 4 is a side view of the same with a clutch of different construction.

The invention consists in the application to the driving-shaft of a pin or clutching-piece to engage the pulley or fan-hub, in combination with a shifting rod inserted inside the driving-shaft and extended below the rotating fan, to be operated from the floor.

The fan-blades are secured to a hub, F, in the usual manner, the latter being attached to the lower end of the upright fan-shaft C, so that the blades may rotate without interfering at all with the hanger B.

The driving-pulley D is sustained between bearings B′ in the hanger, and is usually, with the hub F, fixed to rotate with the fan-shaft C.

In my invention either the pulley or hub is fitted to revolve loosely upon the shaft, and is only attached thereto by the operation of the clutching apparatus.

In Fig. 1 the pulley D is made loose upon the shaft, so that it may rotate continuously, and the shaft be connected with it only at the pleasure of the operator.

The clutch mechanism is shown in Figs. 1 and 2, and consists in a transverse pin, *a*, inserted across the shaft beneath the end of the pulley-hub D′ and fastened into a shifting rod, *b*, which is inserted in a central bore, *d*, formed inside the fan-shaft C. The pulley-hub is provided with a notch, *c*, and the shaft is slotted at *f* to coincide with the notch, so that the pin may be pushed upward into the notch by pressing upon the lower end of the rod *b*. To make the latter more accessible to the operator, it may be extended downward any distance below the hanger or fan, and to prevent the oil in the bearing B′ from dripping down the rod it is preferably terminated with an oil-cup, G, which also serves as a handle in pushing up the rod to operate the clutch. In cases where the ceiling is high the rod may be supplemented below the oil-cup by a wire, *b′*, terminated by a knob, ball, or handle, H, and the latter may be swiveled to the wire, so as to remain stationary in the hand when the wire or rod is rotating, as by the washers *h h* (shown fastened to the wire in Fig. 4) at each side of the ball H.

In Fig. 1 it is obvious that the transverse clutching-pin *a* requires a suitable recess into which it can retire when it is withdrawn from the notch *c* in the pulley-hub D′. A collar, I, is therefore inserted between the hub D′ and the lower bearing, B′, and a recess, *e*, is formed in it coinciding with the slot in the fan-shaft C. The collar is secured by a set-screw, *s*, to the shaft, so that it rotates with the latter and with the pin *a*, which is thus always adapted to be pulled down into the recess *e* at any time after it has been clutched into the notch in the pulley. The pulley may, therefore, be rotated continuously while the shaft and fan stand still unless connected to the pulley by pushing up the pin. The notch *c* may be made a little wider at its bottom, as shown in Fig. 1, to keep the pin *a* in place while rotating; but in practice the resistance of the air to the fan keeps the pin in the notch by friction. When the motive power stops the pins automatically drop, and all the fans in the series are thus disengaged when the power starts, rendering it much easier to set the shafting in motion and avoiding the slipping and displacement of the main belts. As required, each fan may be started by pushing up the clutch-rod, and, should any particular fan in the series make more air than is wanted, it can be instantly stopped by pulling down the rod. Two other constructions are shown in Figs. 3 and 4, the clutch-pin in both of them being arranged beneath the hub of the fan, and the latter constructed to rotate loosely upon the shaft C until clutched thereto, the shaft and pulley D being fixed together, as heretofore.

F is the fan-hub, (shown with socket F′,) in which the shanks *l* of the fan-blades are secured by screws *m*, as usual.

I is the supporting-collar, upon which the hub rests, being placed below the hub in Fig. 3, and provided with a recess, *e*, to receive the pin *a* when pulled down, the hub F being provided with a notch, *c*, like hub D′. The oil-cup in this figure is shown as the handle to move the rod *b*.

The collar I is shown in Fig. 4 inserted in a counter-bore in the lower side of hub F, and pinned to the shaft at *n* to support the weight of the fan. The hub is shown provided with clutch-teeth *o*, and the pin *a* is combined with a clutch-collar, *a′*, having similar teeth, *o′*, which engage with the hub F when the rod *b* is pushed up. The rod is shown in this figure with a handle but no oil-cup.

Having thus shown several methods of carrying out my invention, it is obvious that the principle may be embodied in other constructions, and the clutch device be applied to the top of the hubs D′ or F, or to other parts connected with the pulley D or fan-hub F, by which they could be propelled, as desired. It will be seen, therefore, that the essential feature of the invention is the combination, with any suitable clutch mechanism, of a rod, as *b*, depending from the shaft below the fan-hub, so that the clutch may be operated without interference from the fan-blades.

The collar I (shown in Figs. 1 and 3) may be turned around upon the fan-shaft C by loosening the fastening set-screw *s*, and the recess *e* may thus be turned away from the slot *f* to prevent the escape of the pin from the notch *c*. When thus arranged the pin is prevented from dropping and disengaging the fan-hub from its shaft when the power stops.

I claim my invention as follows:

1. The combination, with the hollow fan-shaft, the fan, and suitable clutching mechanism, of a shifting rod, *b*, depending from the center of the shaft below the fan-blades, as set forth.

2. The combination, with the hollow fan-shaft, the pulley D, and fan-hub F, of the notch in the hub, fitted to turn on the shaft, the shifting rod inside the shaft, and the pin operating through a slot in the shaft to engage the notch, substantially as shown and described.

3. The combination, with the hollow shaft C and hub fitted to rotate loosely thereon, of the supporting-collar I, the shifting rod inside the shaft, and the clutch-pin *a*, operating through a slot in the shaft to clutch the hub, the collar having recess *e* and set-screw *s*, and constructed to turn on the shaft, as and for the purpose set forth.

4. The combination, with the fan-shaft, the fan, and their clutching mechanism, of a shifting rod depending from the center of the shaft, and an oil-cup attached thereto, as and for the purpose set forth.

5. The combination, with the fan-shaft, the fan, and their clutching mechanism, of a shifting rod depending from the center of the shaft, an oil-cup on the rod to arrest the oil, and a swiveling handle at its lower end, substantially as herein shown and described.

6. The combination, with the fan-shaft, the fan, and their clutching mechanism, of a shifting rod depending below the fan-hub and revolving therewith when the same is in motion, substantially as and for the purpose set forth.

In testimony whereof I have hereunto set my hand in the presence of two subscribing witnesses.

JAMES M. SEYMOUR.

Witnesses:
THOS. S. CRANE,
L. LEE.